US009652906B1

(12) United States Patent
Kondou et al.

(10) Patent No.: US 9,652,906 B1
(45) Date of Patent: May 16, 2017

(54) ROLLOVER PREDICTOR JUDGMENT DEVICE OF COMBINATION VEHICLE AND COMBINATION VEHICLE

(71) Applicant: Komatsu Ltd., Minato-ku, Tokyo (JP)

(72) Inventors: Shinya Kondou, Hitachinaka (JP); Shunsuke Mori, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/026,159

(22) PCT Filed: Oct. 23, 2015

(86) PCT No.: PCT/JP2015/080039
§ 371 (c)(1),
(2) Date: Mar. 30, 2016

(87) PCT Pub. No.: WO2016/039488
PCT Pub. Date: Mar. 17, 2016

(51) Int. Cl.
*G07C 5/08* (2006.01)
*B62D 53/00* (2006.01)

(52) U.S. Cl.
CPC ......... *G07C 5/0816* (2013.01); *G07C 5/0808* (2013.01); *B62D 53/00* (2013.01)

(58) Field of Classification Search
CPC ..... G07C 5/0816; G07C 5/0808; B62D 53/00
See application file for complete search history.

(56) References Cited

U.S. PATENT DOCUMENTS

| 2001/0037677 A1 | 11/2001 | Holst et al. |
| 2005/0015191 A1 | 1/2005 | Banno et al. |
| 2008/0208424 A1* | 8/2008 | Hartman ............... B60T 8/1708 701/70 |

FOREIGN PATENT DOCUMENTS

| JP | H02-006282 | 1/1990 |
| JP | 2001-347910 | 12/2001 |
| JP | 2001-354128 | 12/2001 |
| JP | 2002-137766 | 5/2002 |
| JP | 2005-036750 | 2/2005 |
| JP | 2008-273504 | 11/2008 |
| JP | 2014-196005 | 10/2014 |

OTHER PUBLICATIONS

International Search Report and Written Opinion in International Application No. PCT/JP2015/080039, mailed Dec. 22, 2015, 10 pages.

* cited by examiner

*Primary Examiner* — Yuen Wong
(74) *Attorney, Agent, or Firm* — Fish & Richardson P.C.

(57) ABSTRACT

A rollover predictor judgment device for a combination vehicle includes a lateral acceleration sensor, a yaw rate sensor, an articulate angle sensor, and a judgment device in a form of a retarder controller. The judgment device judges that the combination vehicle is in a rollover predictor status when a first lateral acceleration calculated based on a detection value of the lateral acceleration sensor is a first threshold or more or when a second lateral acceleration calculated based on a detection value of the yaw rate sensor and a detection value of the articulate angle sensor is a second threshold or more.

10 Claims, 10 Drawing Sheets

ROLLOVER PREDICTOR JUDGMENT DEVICE OF COMBINATION VEHICLE AND COMBINATION VEHICLE

CROSS-REFERENCE TO RELATED APPLICATION

This application is a National Stage Application under 35 U.S.C. §371 and claims the benefit of International Application No. PCT/JP2015/080039, filed Oct. 23, 2015. The disclosure of the foregoing application is hereby incorporated by reference in its entirety

TECHNICAL FIELD

The present invention relates to a rollover predictor judgment device for a combination vehicle such as an articulated dump truck and a combination vehicle.

BACKGROUND ART

It has been typically known to detect possibility of occurrence of an accident such as an overturn in a combination vehicle including a front vehicle body having a cab and a rear vehicle body having a cargo bay and the like, the front vehicle body and the rear vehicle body being connected with each other (see, for instance, Patent Literatures 1, 2).

A combination vehicle (e.g. trailer truck) disclosed in Patent Literature 1 includes: a towing portion; a towed portion; a towing-portion sensor provided on the towing portion; towed-portion sensor provided on the towed portion; one or more steering sensor; one or more environmental sensor; one or more wheel speed sensor; and a processing device that analyzes the data received by the sensors. At this time, the processing device: compares a first threshold with a difference between a towing-portion yawing speed detected by the towing-portion sensor and a towing-portion yawing speed intended by an operator based on the data from the steering sensor; compares a second threshold with a difference between a towed-portion yawing speed detected by the towed-portion sensor and a towed-portion yawing speed intended by the operator based on the data from the steering sensor; compares a third threshold with a difference between towed-portion yawing speed and the towing-portion yawing speed; judges whether or not a correction control is necessary based on the results of the comparisons; and judges which one of correction controls should used based on the differences in the above three calculation results.

Further, the processing device determines the correction control to be started based on the data including the towing-portion yawing speed, the towed-portion yawing speed, towing-portion lateral acceleration, towed-portion lateral acceleration and the wheel speed sensor.

Patent Literature 2 discloses a rollover-prevention device for preventing rollover of vehicles such as bus, truck and tractor-trailer combination vehicle. A first rollover-prevention device disclosed in Patent Literature 2 calculates a roll status of the vehicle based on a data inputted through a switch for selecting a wheel base of the vehicle and a switch for selecting steering gear ratio, and signals from various sensors including roll angle sensor for detecting a roll angle of a vehicle body; a steering-angle sensor and vehicle speed sensor. The first rollover-prevention device issues a rolling danger warning information and alarms an operator with an alarm buzzer.

Further, a second rollover-prevention device calculates a roll status of the vehicle based on a data from a roll angle detector for detecting a roll angle of a vehicle body and a lateral G sensor for detecting lateral acceleration of the vehicle body. The second rollover-prevention device issues a rolling danger warning information and alarms an operator with an alarm buzzer.

CITATION LIST

Patent Literature(s)

Patent Literature 1 JP-A-2008-273504
Patent Literature 2 JP-A-2001-347910

SUMMARY OF THE INVENTION

Problem(s) to be Solved by the Invention

It should be noted that the possibility of rollover of a rear vehicle body of a combination vehicle can be determined based mainly on a lateral acceleration of the rear vehicle body.

At this time, with the use of a sensor for detecting a lateral acceleration as in Patent Literature 1 and the second rollover prevention device in Patent Literature 2, when the roll angle of the rear vehicle body is large (e.g. during a turning movement), the sensor cannot correctly detect the lateral acceleration and the rollover predictor status of the rear vehicle body may not be appropriately judged.

Further, when the lateral acceleration is detected using the steering-angle sensor and the vehicle speed sensor as in the first rollover-prevention device of Patent Literature 2, the vehicle speed cannot be correctly detected when the tire is locked, and, consequently, the lateral acceleration may not be correctly detected, resulting in failure in appropriately judging the rollover predictor status of the rear vehicle body.

An object of the invention is to provide a rollover-predictor judgment device capable of appropriately judging a rollover predictor status of a rear vehicle body of a combination vehicle, and a combination vehicle.

Means for Solving the Problem(s)

A rollover predictor judgment device according to an aspect of the invention is for a combination vehicle including a front vehicle body and a rear vehicle body swingably connected to the front vehicle body, the rollover predictor judgment device including: a lateral acceleration sensor that is configured to detect an acceleration of the rear vehicle body in a right-left direction; a yaw rate sensor that is configured to detect a yaw rate of the rear vehicle body; a steering-angle sensor that is configured to detect a steering angle of the front vehicle body with respect to the rear vehicle body; and a judgment device that is configured to judge whether or not the combination vehicle is in a rollover predictor status based on a detection data detected by the lateral acceleration sensor, the yaw rate sensor and the steering-angle sensor, in which the judgment device is configured to judge that the combination vehicle is in the rollover predictor status when the first lateral acceleration calculated based on a detection value of the lateral acceleration sensor is a first threshold or more or when a second lateral acceleration calculated based on a detection value of the yaw rate sensor and a detection value of the steering-angle sensor is a second threshold or more.

In the above aspect of the invention, since the rollover predictor is judged by comparing the two lateral accelerations with corresponding thresholds, the rollover predictor can be appropriately judged for the combination vehicle in various travelling states. Accordingly, the rollover predictor judgment of the rear vehicle body can be appropriately performed.

Especially, since the rollover predictor is judged based on the first lateral acceleration and the second lateral acceleration, at least one of the lateral accelerations exhibits a high detection accuracy during a large-roll-angle case, tire-slip/tire-lock and understeering/oversteering, so that the rollover predictor can be appropriately judged.

A rollover predictor judgment device according to another aspect of the invention is for a combination vehicle including a front vehicle body and a rear vehicle body swingably connected to the front vehicle body, the rollover predictor judgment device including: a lateral acceleration sensor that is configured to detect an acceleration of the rear vehicle body in a right-left direction; a vehicle speed sensor that is configured to detect a speed of the combination vehicle; a steering-angle sensor that is configured to detect a steering angle of the front vehicle body with respect to the rear vehicle body; and a judgment device that is configured to judge whether or not the combination vehicle is in a rollover predictor status based on a detection data detected by the lateral acceleration sensor, the vehicle speed sensor and the steering-angle sensor, in which the judgment device is configured to judge that the vehicle is in the rollover predictor status when a first lateral acceleration calculated based on a detection value of the lateral acceleration sensor is a first threshold or more or when a third lateral acceleration calculated based on a detection value of the vehicle speed sensor and a detection value of the steering angle sensor is a third threshold or more.

In the above aspect of the invention, since the rollover predictor is judged by comparing the two lateral accelerations with corresponding thresholds, the rollover predictor can be appropriately judged for the combination vehicle in various travelling states. Accordingly, the rollover predictor judgment of the rear vehicle body can be appropriately performed.

Especially, since the rollover predictor is judged based on the first lateral acceleration and the third lateral acceleration, at least one of the lateral accelerations exhibits a high detection accuracy and excellent responsiveness during a large-roll-angle case, tire-slip/tire-lock and understeering/oversteering, so that the rollover predictor can be appropriately judged.

In the rollover predictor judgment device for a combination vehicle according to the above aspect of the invention, it is preferable that the rollover predictor judgment device further includes a yaw rate sensor that is configured to detect a yaw rate of the rear vehicle body, in which the judgment device is configured to judge that the combination vehicle is in the rollover predictor status when a second lateral acceleration calculated based on a detection value of the yaw rate sensor and the detection value of the steering-angle sensor is a second threshold or more.

In the rollover predictor judgment device for a combination vehicle according to the above aspect of the invention, it is preferable that the rollover predictor judgment device further includes a yaw rate sensor that is configured to detect a yaw rate of the rear vehicle body; and a vehicle speed sensor that is configured to detect a speed of the combination vehicle, in which the judgment device is configured to judge that the combination vehicle is in the rollover predictor status when a fourth lateral acceleration calculated based on a detection value of the yaw rate sensor and the detection value of the vehicle speed sensor is a fourth threshold or more.

In the rollover predictor judgment device for a combination vehicle according to the above aspect of the invention, it is preferable that the rollover predictor judgment device further includes a roll angle sensor that is configured to detect a roll angle of the rear vehicle body, in which the judgment device is configured to correct the detection value of the lateral acceleration sensor based on a detection value of the roll angle sensor to calculate the first lateral acceleration.

In the rollover predictor judgment device for a combination vehicle according to the above aspect of the invention, it is preferable that the judgment device is configured to multiply a square of a detection value of the yaw rate sensor by a revolution radius calculated based on the detection value of the steering-angle sensor to calculate the second lateral acceleration.

In the rollover predictor judgment device for a combination vehicle according to the above aspect of the invention, it is preferable that the judgment device is configured to divide a square of the vehicle speed calculated based on the detection value of vehicle speed sensor by a revolution radius calculated based on the detection value of the steering-angle sensor to calculate the third lateral acceleration.

A combination vehicle according to still another aspect of the invention includes: the above rollover predictor judgment device; and a notifying device that is configured to notify that the combination vehicle is in a rollover predictor status when the rollover predictor judgment device judges that the combination vehicle is in the rollover predictor status.

In the combination vehicle according to the above aspect of the invention, it is preferable that the judgment device is configured to output a notification signal to let the notifying device to notify that the combination vehicle is in the rollover predictor status and, subsequently, configured to stop outputting the notification signal when a status judged not to be in the rollover predictor status continued for a predetermined period.

DESCRIPTION OF EMBODIMENT(S)

First Exemplary Embodiment

A first exemplary embodiment of the invention will be described below with reference to the attached drawings.

Figure 1:
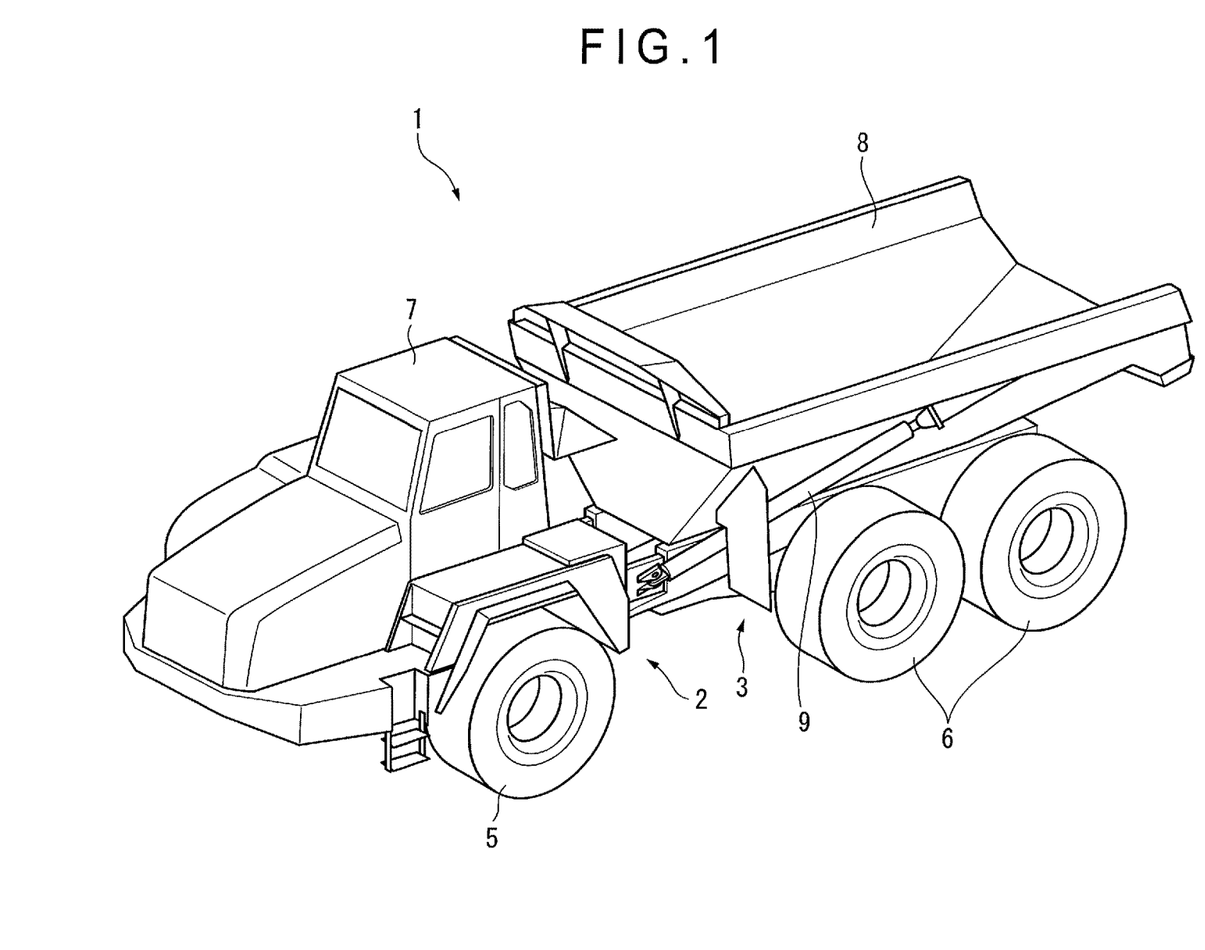
FIG. 1 is a perspective view showing a combination vehicle according to a first exemplary embodiment of the invention in a form of an articulated dump truck.
Figure 2:
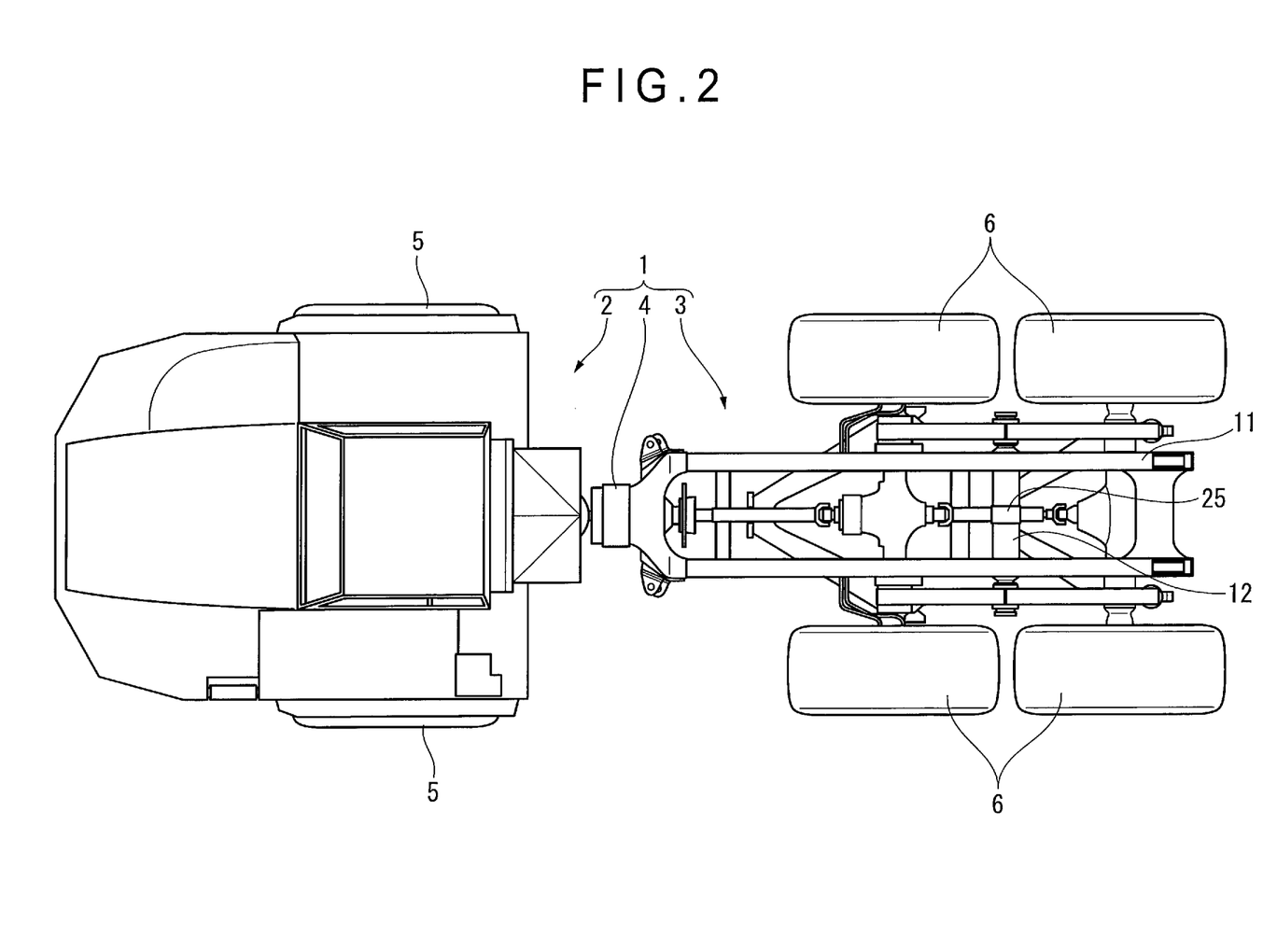
FIG. 2 is a plan view showing a relevant part of the articulated dump truck.

FIGS. 1 and 2 show a combination vehicle 1 (articulated dump truck) of the first exemplary embodiment. It should be noted that, in the description of the drawings, a vehicle front-back direction, a vehicle width direction and a vehicle vertical direction for an operator in a normal operation attitude of the combination vehicle 1 will be respectively simply referred to as a front-back direction, a right-left direction and a vertical direction.

Outline of Combination Vehicle 1

The combination vehicle 1 includes a front vehicle body 2 having front wheels 5, a rear vehicle body 3 having rear wheels 6, and a connecting device 4 connecting the front vehicle body 2 and the rear vehicle body 3. The combination vehicle 1 is a six-wheel drive vehicle in which all of the two front wheels 5 and four rear wheels 6 are driven.

A cab 7 is provided on the front vehicle body 2. A dump body 8 on which soil, sand and the like are loaded is provided on the rear vehicle body 3. The dump body 8 is inclined rearward using a dump cylinder 9 when the soil and the like are dumped.

The connecting device 4 connects the rear vehicle body 3 to the front vehicle body 2 so that the rear vehicle body 3 is rotatable around a horizontal axis along the front-back direction of the combination vehicle 1 and around a vertical axis.

Arrangement of Sensor

Figure 3:
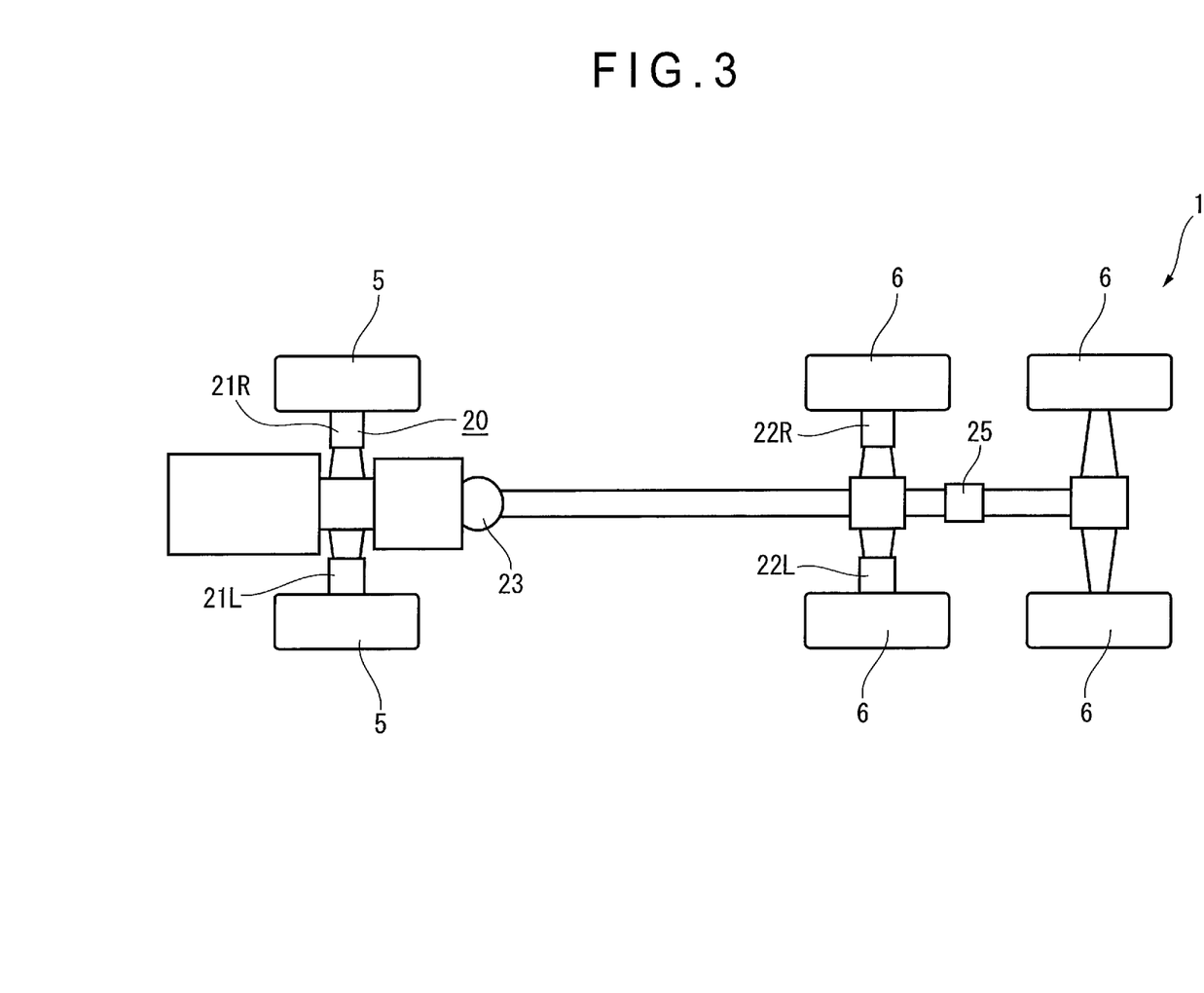
FIG. 3 is a schematic plan view showing locations of sensors in the combination vehicle.
Figure 4:
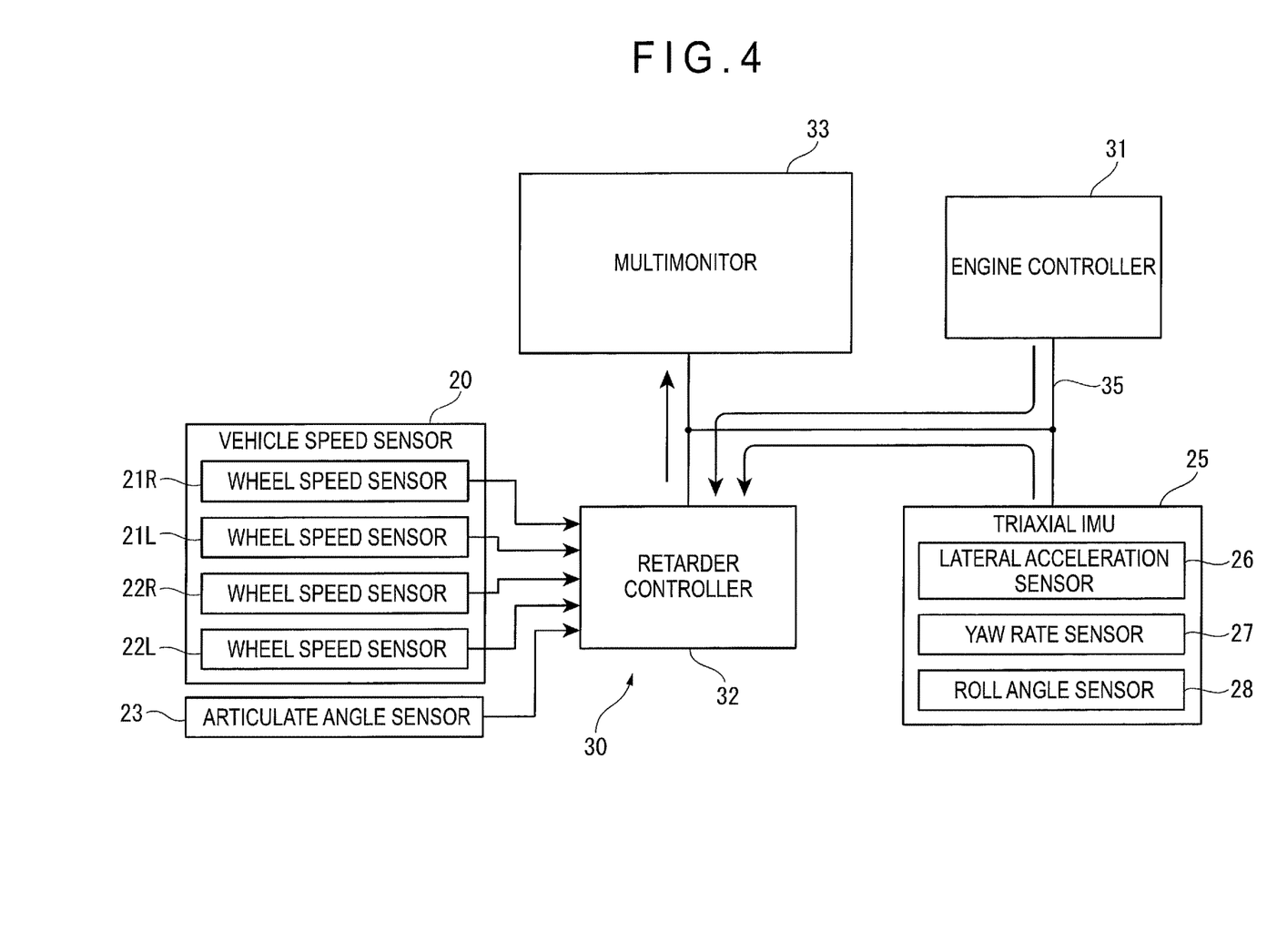
FIG. 4 is a block diagram showing an arrangement of a rollover-predictor judgment device.

Next, sensors used in the first exemplary embodiment will be described below with reference to FIGS. 3 and 4.

The combination vehicle 1 includes: a vehicle speed sensor 20 that is configured to detect vehicle speed information of the combination vehicle 1; an articulate angle sensor (steering-angle sensor) 23 that is configured to detect an articulate angle (steering angle information) of the front vehicle body 2 with respect to the rear vehicle body 3; and an Inertial Measurement Unit (IMU) 25.

The vehicle speed sensor 20 includes wheel speed sensors 21L, 21R that is configured to detect rotation speeds of right and left front wheels 5, and wheel speed sensors 22L, 22R that is configured to detect rotation speeds of right and left rear wheels 6.

It should be noted that the steering-angle sensor is not limited to the articulate angle sensor 23 but may alternatively be a sensor configured to detect a steering angle of a handle operated by the operator.

The IMU 25 at least detects a lateral acceleration, yaw rate (yaw angle speed), and a roll angle of the rear vehicle body 3. Accordingly, the IMU 25 serves as a lateral acceleration sensor 26 configured to detect the lateral acceleration, a yaw rate sensor 27 configured to detect a yaw rate, and a roll angle sensor 28 configured to detect a roll angle.

It is preferable that the IMU 25 is disposed at a position close to a centroid of a rear frame 11 of the rear vehicle body 3. In the first exemplary embodiment, as shown in FIG. 2, the IMU 25 is disposed on a cross member 12 capable of receiving the IMU 25 and disposed at a position close to the centroid of the rear frame 11. Accordingly, the accuracy of the values detected by the IMU 25 can be enhanced, and a judgment accuracy of the rollover predictor status judged based on the detected values can also be enhanced. It should be noted that, when the IMU 25 is greatly remote from the centroid and the accuracy of the detected values may influence on the judgment accuracy, the detected values may be corrected according to the distance between the centroid and the IMU 25.

Arrangement of Rollover Predictor Judgment Device

Next, a rollover predictor judgment device 30 in the first exemplary embodiment will be described below with reference to FIG. 4.

The combination vehicle 1 includes an engine controller 31, a retarder controller 32, and a multimonitor 33. The engine controller 31, the retarder controller 32, the multimonitor 33, and the IMU 25 are connected in a manner capable of mutual communication through a Controller Area Network (CAN) 35.

The engine controller 31 controls operations of an engine provided on the front vehicle body 2. The engine controller 31 outputs accelerator information (accelerator flag) indicating on/off status of an accelerator to the retarder controller 32.

The retarder controller 32 is a controller for controlling a retarder provided on the combination vehicle 1. The retarder controller 32 is also used as a judgment device configured to detect whether or not the rear vehicle body 3 is in the rollover predictor status.

The multimonitor 33 is disposed in the cab 7 and is used for a notifying device configured to notify the operator of the rollover predictor status. For instance, the multimonitor 33 displays thereon an icon indicating that the vehicle is in the rollover predictor status, flashes a lamp or issues a buzzer sound to notify the operator of the rollover predictor status.

The retarder controller 32 receives the accelerator information outputted by the engine controller 31, the lateral acceleration, the yaw rate, and the roll angle outputted by the IMU 25, the wheel speeds outputted by the wheel speed sensors 21R, 21L, 22R, 22L, and the articulate angle (steering angle) outputted by the articulate angle sensor 23. The retarder controller 32 judges based on the information whether or not the vehicle is in the rollover predictor status as described below, and, when it is judged that the vehicle is in the rollover predictor status, the retarder controller 32 outputs a notification signal to the multimonitor 33.

Upon receipt of the notification signal from the retarder controller 32, the multimonitor 33 notifies the operator of the rollover predictor status through a screen image, sound or the like.

Accordingly, the retarder controller 32 (judgment device), the vehicle speed sensor 20 (the wheel speed sensors 21L, 21R, 22R, 22L), the articulate angle sensor 23, the IMU 25 serving as the lateral acceleration sensor 26, the yaw rate sensor 27 and the roll angle sensor 28 define the rollover predictor judgment device 30. The combination vehicle 1 includes the rollover predictor judgment device 30 and the multimonitor 33 (notifying device).

Rollover Predictor Judgment Process

Figure 5:
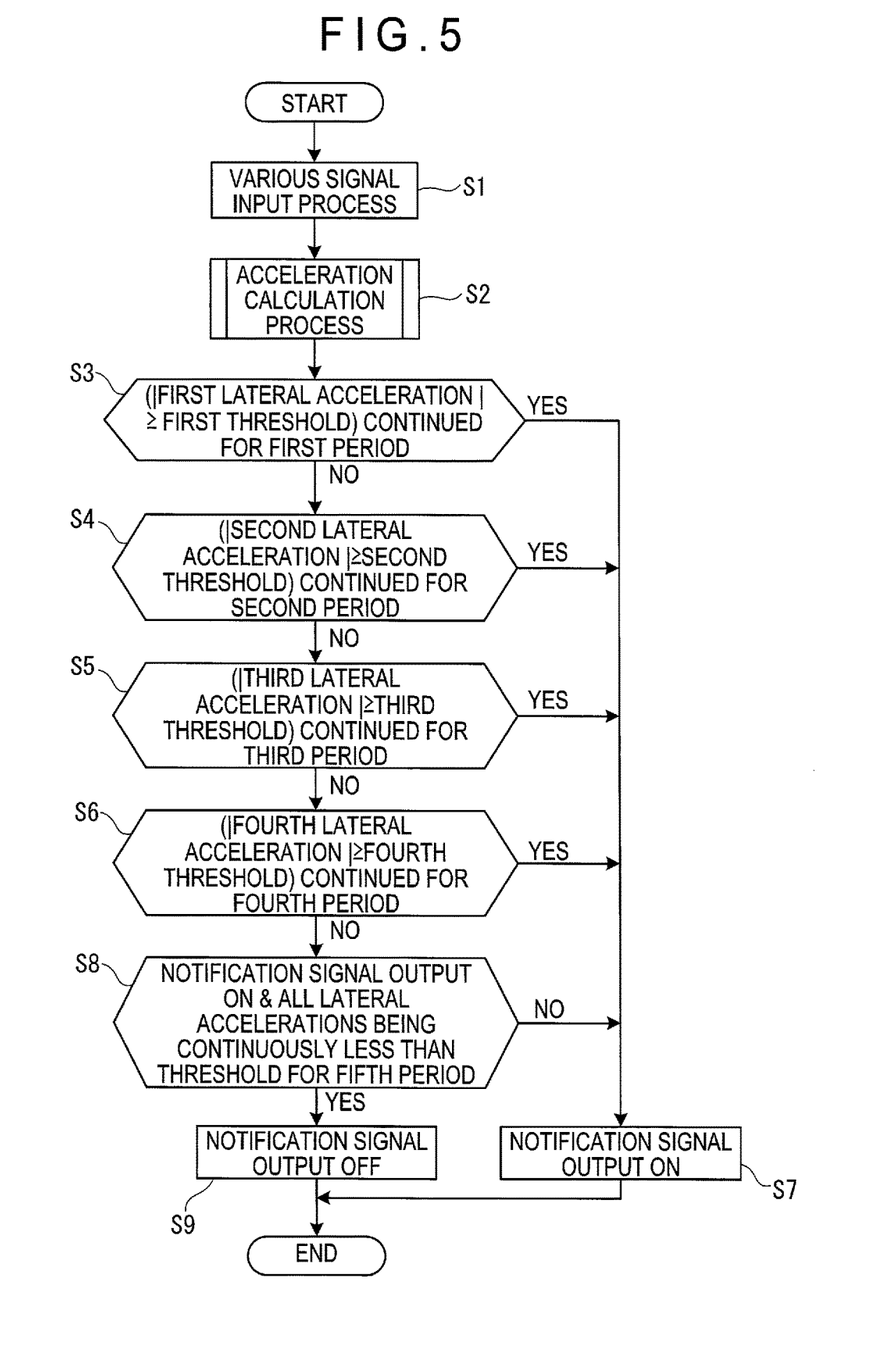
FIG. 5 is flowchart showing a rollover-predictor judgment process.

Next, a rollover predictor judgment process in the rollover predictor judgment device 30 will be described below with reference to a flowchart in FIG. 5.

When the rollover predictor judgment process is started, the retarder controller 32 of the rollover predictor judgment device 30 performs receipt process of various signals (Step S1). In the first exemplary embodiment, as described above, the wheel speed, the articulate angle (steering angle), the lateral acceleration, the yaw rate, the roll angle, and the accelerator information are inputted by the vehicle speed sensor 20, the articulate angle sensor 23, the IMU 25 and the engine controller 31. It should be noted that the lateral acceleration measured by the lateral acceleration sensor 26 contains large noises being influenced by irregularities on the road surface. Accordingly, the retarder controller 32 filters the lateral acceleration (input signal) using a low-pass filter and the like. The retarder controller 32 also filters the input signals of the yaw rate and the roll angle using a low-pass filter and the like.

Acceleration Calculation Process

Figure 6:
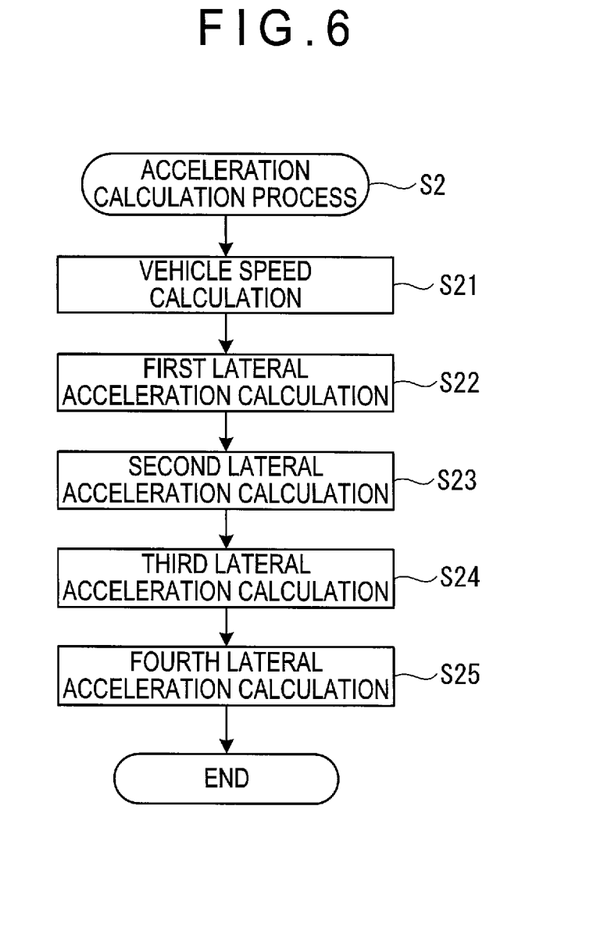
FIG. 6 is flowchart showing an acceleration calculation process.

Next, the retarder controller 32 performs a calculation process of the acceleration using the inputted signals (Step S2). The details of the acceleration calculation process S2 is shown in FIG. 6.

The retarder controller 32 calculates a vehicle speed v of the combination vehicle 1 using the accelerator information, and the wheel speeds outputted by the four wheel speed sensors 21L, 21R, 22L, 22R (Step S21).

Specifically, the retarder controller 32 determines the lowest one of the wheel speeds of the four wheels as the vehicle speed v (m/s) when the accelerator information is on (i.e. while power running). This is because a part of tires may slip to be freely rotated and thus the wheel speed may be detected higher than an actual value. Accordingly, it is preferable that the lowest wheel speed is set as the vehicle speed.

Further, the retarder controller 32 determines the highest one of the wheel speeds of the four wheels as the vehicle speed v (m/s) when the accelerator information is off (i.e. while not power running). This is because a part of tires may be locked on, for instance, a downhill and thus the wheel speed may be detected lower than an actual value. Accordingly, it is preferable that the lowest wheel speed is set as the vehicle speed.

First Lateral Acceleration Calculation Process

Figure 7:
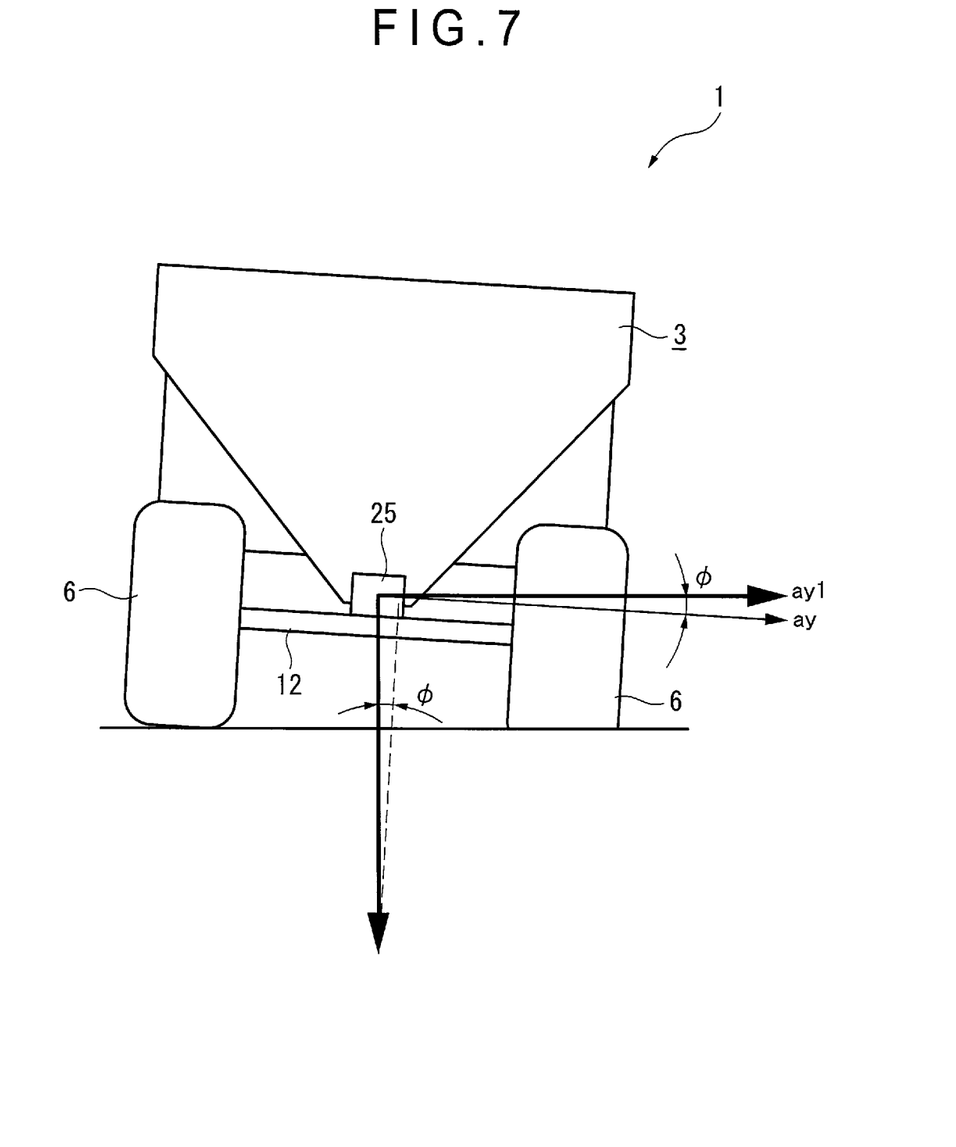
FIG. 7 is an illustration showing a principle for calculating a first lateral acceleration ay1.

The retarder controller 32 calculates the first lateral acceleration ay1 (m/s$^2$) using the lateral acceleration ay (m/s$^2$) and the roll angle φ inputted by the IMU 25 (Step S22). Specifically, the IMU 25 that is configured to measure the lateral acceleration ay is disposed on the cross member 12 of the rear frame 11. Accordingly, when the rear vehicle body 3 and, consequently, the IMU 25 are slanted in the right-left direction as shown in FIG. 7, the lateral acceleration ay measured by the IMU 25 indicates acceleration in a direction slanted by a slant angle (roll angle) φ with respect to the horizontal direction. Accordingly, supposing that gravity acceleration is g, the actual lateral acceleration ay1 of the rear vehicle body 3 can be calculated according to Formula 1 below.

$$ay1=(ay-g\times\sin \phi)/\cos \phi \qquad \text{Formula 1}$$

Second Lateral Acceleration Calculation Process

Figure 8:
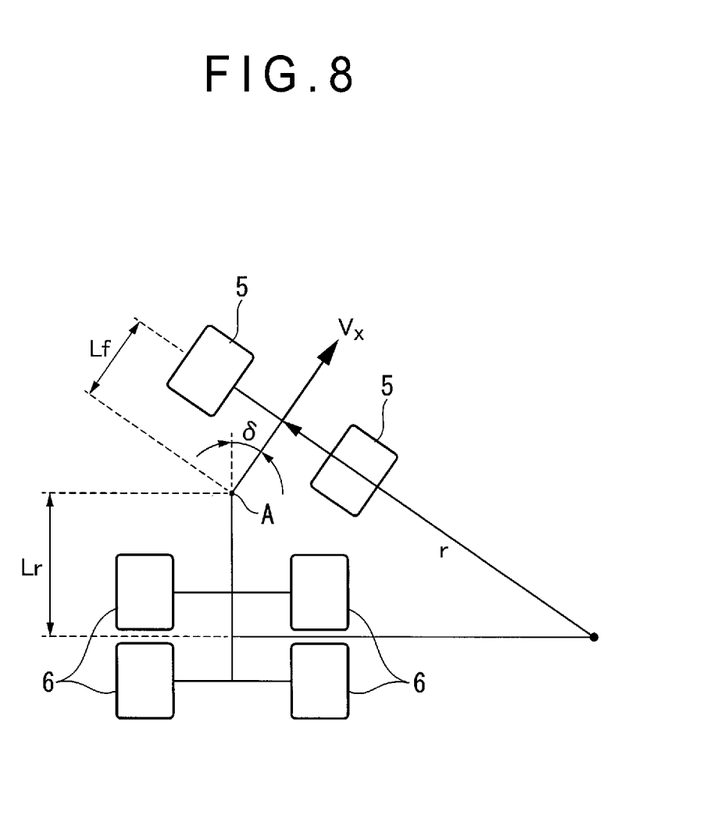
FIG. 8 is an illustration showing a principle for calculating a revolution radius r.

The retarder controller 32 calculates the second lateral acceleration ay2 (m/s$^2$) using the yaw rate R (rad/sec) and the revolution radius r (m) of the combination vehicle 1 inputted by the IMU 25 (Step S23). As shown in FIG. 8, supposing that δ represents the articulate angle (steering angle), and Lf and Lr respectively represent a distance from a vehicle flexing point A to a front wheel axle and a distance from the vehicle flexing point A to a rear wheel axel, the revolution radius r can be calculated according to Formula 2 below. It should be noted that, since the combination vehicle 1 includes four rear wheels 6, the distance Lr is defined as a distance from the vehicle flexing point A to a center position between the two axels of the rear wheels 6.

$$r=(Lr+Lf\times\cos \delta)/\sin \delta \qquad \text{Formula 2}$$

The retarder controller 32 calculates the second lateral acceleration according to Formula 3 below using the yaw rate R and the revolution radius r.

$$ay2=R^2\times r \qquad \text{Formula 3}$$

Third Lateral Acceleration Calculation Process

The retarder controller 32 calculates the third lateral acceleration ay3 (m/s$^2$) using the vehicle speed v (m/s) and the revolution radius r (m) according to Formula 4 below.

$$ay3=v^2/r \qquad \text{Formula 4}$$

Fourth Lateral Acceleration Calculation Process

The retarder controller 32 calculates the fourth lateral acceleration ay4 (m/s$^2$) using the yaw rate R (rad/sec) and the vehicle speed v (m/s) according to Formula 5 below.

$$ay4=R\times v \qquad \text{Formula 5}$$

Rollover Predictor Judgment Process

When the first to fourth lateral accelerations are calculated according to the above acceleration calculation process S2, the retarder controller 32 judges whether or not the first to fourth lateral accelerations are thresholds or more. In other words, the retarder controller 32 judges whether or not the vehicle is in the rollover predictor status.

The retarder controller 32 judges whether or not a period in which an absolute value of the calculated first lateral acceleration ay1 is a first threshold a1 or more continues for a first period t1 (Step S3).

When the judgment result of the retarder controller 32 in Step S3 is "NO", the retarder controller 32 judges whether or not a period in which an absolute value of the calculated second lateral acceleration ay2 is a second threshold a2 or more continues for a second period t2 (Step S4).

When the judgment result of the retarder controller 32 in Step S4 is "NO", the retarder controller 32 judges whether or not a period in which an absolute value of the calculated third lateral acceleration ay3 is a third threshold a3 or more continues for a third period t3 (Step S5).

When the judgment result of the retarder controller 32 in Step S5 is "NO", the retarder controller 32 judges whether or not a period in which an absolute value of the calculated fourth lateral acceleration ay4 is a fourth threshold a4 or more continues for a fourth period t4 (Step S6).

It should be noted that the first to fourth thresholds a1 to a4 in Steps S3 to S6 are preset thresholds, which are set by obtaining rollover conditions and the like of the combination vehicle 1 to be controlled based on simulations or verification experiments using an actual vehicle, and adding a margin until the vehicle is rolled over. The margin may be set based on a time required for an operator to perform a rollover prevention operation (e.g. deceleration operation) after being notified that the vehicle is in the rollover predictor status.

Further, the thresholds a1 to a4 are corrected in accordance with the vehicle status (e.g. whether the vehicle is loaded or not). For instance, the first to fourth thresholds a1 to a4 may be set at a value calculated by adding a correction value in accordance with the vehicle status of the combination vehicle 1 to a nominal acceleration threshold set using the multimonitor 33.

Further, the first to fourth lateral accelerations ay1 to ay4 are lateral accelerations applied to the rear vehicle body 3 and thus are substantially equal. Accordingly, all of the first to fourth thresholds a1 to a4 may be set at the same values. However, the first to fourth thresholds a1 to a4 may be adjusted in consideration of the characteristics of each of the first to fourth lateral accelerations ay1 to ay4. For instance, since the first lateral acceleration ay1 is calculated using the lateral acceleration ay inputted by the IMU 25, the first lateral acceleration ay1 is more likely to be influenced by noise than the second to fourth lateral accelerations ay2 to ay4 and thus the value of the first lateral acceleration ay1 is increased by the noise to cause an erroneous judgment. Accordingly, the first threshold a1 may be set higher than the second to fourth thresholds a2 to a4.

In Step S3 to S6, the first to fourth periods t1 to t4 are defined so as to prevent an erroneous judgment occurring when the values of the first to fourth lateral accelerations ay1 to ay4 momentarily exceed the thresholds being influenced by the noise and the like. The first to fourth periods t1 to t4 may be defined in a range capable of judging that the values of the first to fourth lateral accelerations ay1 to ay4 exceed the thresholds based on an action of the rear vehicle body 3 (e.g. from about 100 to 500 msec).

Notification Signal Output Process

When the result of the judgment by the retarder controller 32 is "YES" in any one of Steps S3 to S6, the retarder controller 32 outputs a notification signal for the notification of the rollover predictor status to the multimonitor 33 (Step S7). On receipt of the notification signal, the multimonitor 33 notifies the operator of the rollover predictor status to call the operator's attention by flashing a predetermined alarm screen or beeping a buzzer.

With the above operation, the operator can notice the rollover predictor status and conduct deceleration and/or steering operation, thereby preventing the occurrence of the rollover in advance. It should be noted that, without the deceleration operation by the operator, the retarder controller 32 may automatically perform a deceleration control when the rollover predictor status continues for a predetermined time or more.

After the process in Step S7 is completed, the retarder controller 32 ends the rollover predictor judgment process. Then, the retarder controller 32 repeats the process from Step S1 when the next signal input timing comes. For instance, when the retarder controller 32 receives the signals per 10 msec, the rollover predictor judgment process shown in FIG. 5 is also performed per 10 msec. In this case, when it is detected that that the first lateral acceleration ay1 is the first threshold a1 or more for ten consecutive times, it can be judged that the first lateral acceleration ay1 is continuously the first threshold a1 or more for 100 msec.

Notification Signal Continuation Judgment Process

When all of the judgment results of the retarder controller 32 in Steps S3 to S6 are "NO", the retarder controller 32 judges whether or not a period in which all of the first to fourth lateral accelerations ay1 to ay4 are continuously corresponding thresholds or more for a fifth period t5 (Step S8). When the judgment result of the retarder controller 32 in Step S8 is "NO", the retarder controller 32 continues outputting the notification signal (Step S7).

Notification Signal Output Termination Process

On the other hand, when the judgment result of the retarder controller 32 in Step S8 is "YES", the retarder controller 32 sets "OFF" the output of the notification signal (Step S9). When the output of the notification signal from the retarder controller 32 is set off, the multimonitor 33 stops the notification of the rollover predictor status.

It should be noted that the fifth period t5 is set longer than the first to fourth periods (e.g. two seconds). The fifth period t5 defines the condition for stopping the notification of the rollover predictor status. In order to reliably judge that all of the lateral accelerations are decreased to be capable of avoiding the rollover, the fifth period t5 is set longer than the judgment periods t1 to t4 for outputting the notification signal of the rollover predictor status. Further, if the notification time of the rollover predictor status is too short, the operator may not notice the presence of the notification. Accordingly, the fifth period t5 is set as a period sufficient for the operator to pay attention therefor, and the notification of the rollover predictor status is set to continue for the fifth period t5.

After the process in Step S9 is completed, the retarder controller 32 ends the rollover predictor judgment process. Then, as described above, the retarder controller 32 repeats the process from Step S1 when the next signal input timing comes.

Features of Judgment Method

In the above rollover predictor judgment process, the first to fourth lateral accelerations have the features as shown in Table 1. The rollover predictor judgment device 30 judges that the vehicle is in the rollover predictor status when at least one of the first to fourth lateral accelerations reaches the threshold or more, so that rollover predictor judgment device 30 can appropriately judge the rollover predictor in various circumstances.

In Table 1, the detection accuracies of the first to fourth lateral accelerations are evaluated in various circumstances, where "A" indicates an instance in which a high detection accuracy can be obtained and "B" indicates an instance in which the detection accuracy is slightly low.

A case when the roll angle is large (represented as "large-roll-angle case" in Table 1) means an instance in which the roll angle increases. Tire-slip/tire-lock means an instance where the tire(s) is slipped or locked being influenced by a road surface condition. Understeering/oversteering means an instance in which understeering or oversteering occurs being influenced by a road surface condition or the like. The responsiveness means an evaluation relating to the timing capable of detecting the lateral acceleration.

TABLE 1

| Lateral Acceleration | Large-Roll-Angle Case | Tire-Slip/Tire-Lock | Responsiveness | Understeering/Oversteering |
|---|---|---|---|---|
| 1st Lateral Acceleration ay1 | B | A | B | A |
| 2nd Lateral Acceleration ay2 | A | A | B | B |
| 3rd Lateral Acceleration ay3 | A | B | A | B |
| 4th Lateral Acceleration ay4 | A | B | B | A |

Evaluation of First Lateral Acceleration Ay1

The roll angle sensor 28 of the IMU 25 obtains the roll angle using an integral value. Accordingly, when the rear vehicle body 3 keeps rolling, the detection value of the roll angle sensor 28 sometimes becomes larger than an actual roll angle. Consequently, the lateral acceleration ay detected by the IMU 25 and the first lateral acceleration ay1 calculated considering the roll angle may also involve some errors. Thus, an instance with a large roll angle is evaluated as "B."

Further, the first lateral acceleration ay1 is calculated based on the lateral acceleration ay actually detected by the IMU 25. Accordingly, the first lateral acceleration ay1 cannot be detected without an action of the rear vehicle body 3 causing the lateral acceleration (e.g. turning) and thus the responsiveness slightly decreases. Thus, the responsiveness is evaluated as "B."

On the other hand, since the first lateral acceleration ay1 is based on the lateral acceleration ay directly measured by the lateral acceleration sensor 26, it is not necessary to use the vehicle speed and thus can be appropriately determined even when the vehicle speed cannot be accurately measured (e.g. tire-locking). Accordingly, tire-slip/tire-lock is evaluated as "A."

Further, since the first lateral acceleration ay1 can be obtained without the use of revolution radius, the first lateral acceleration ay1 can be appropriately determined even when the revolution radius is erroneously estimated at the time of understeering or oversteering based on the articulate angle δ, the understeering/oversteering is evaluated as "A."

Evaluation of Second Lateral Acceleration Ay2

Since the second lateral acceleration ay2 uses the yaw rate measured by the yaw rate sensor 27 and the yaw rate cannot be detected until the rear vehicle body 3 is actually turned, the responsiveness slightly decreases. Accordingly, the responsiveness is evaluated as "B."

Further, since the revolution radius r calculated based on the articulate angle δ may be erroneously estimated, the understeering/oversteering is evaluated as "B."

On the other hand, the second lateral acceleration ay2 is calculated without using the measurement value of the lateral acceleration ay and can be appropriately determined even when the roll angle is large. Accordingly, the large-roll-angle case is evaluated as "A."

Further, since the second lateral acceleration ay2 is calculated without using the vehicle speed v, the tire-slip/tire-lock is evaluated as "A."

Evaluation of Third Lateral Acceleration Ay3

Since the third lateral acceleration ay3 is calculated using the vehicle speed v, the tire-slip/tire-lock, in which it is possible that the vehicle speed v is not accurately measured, is evaluated as "B."

Further, since the revolution radius r calculated based on the articulate angle δ may be erroneously estimated, the understeering/oversteering is evaluated as "B."

On the other hand, since the third lateral acceleration ay3 is calculated without using the measurement value of the lateral acceleration ay, the large-roll-angle case is evaluated as "A."

Further, the third lateral acceleration ay3 can be calculated based on the vehicle speed and the articulate angle δ in accordance with the steering angle of the handle and thus can be judged prior to the action of the rear vehicle body 3. Accordingly, the responsiveness is evaluated as "A." Specifically, since there is a time lag in the combination vehicle 1 after the handle is steered until the rear vehicle body 3 is actually turned, the third lateral acceleration ay3 calculated based on the vehicle speed v and the articulate angle δ can be calculated prior to the actual action of the vehicle.

Evaluation of Fourth Lateral Acceleration Ay4

Since the fourth lateral acceleration ay4 is calculated using the vehicle speed v, the tire-slip/tire-lock is evaluated as "B."

Further, since the fourth lateral acceleration ay4 uses the yaw rate measured by the yaw rate sensor 27 and the yaw rate cannot be detected until the rear vehicle body 3 is actually turned, the responsiveness slightly decreases. Accordingly, the responsiveness is evaluated as "B."

On the other hand, since the fourth lateral acceleration ay4 is calculated without using the measurement value of the lateral acceleration ay, the large-roll-angle case is evaluated as "A."

Further, since the fourth lateral acceleration ay4 can be obtained without the use of the revolution radius, the fourth lateral acceleration ay4 can be appropriately determined when the revolution radius is erroneously estimated at the time of understeering/oversteering based on the articulate angle δ. Accordingly, the understeering/oversteering is evaluated as "A."

Effect of First Exemplary Embodiment

According to the above first exemplary embodiment, the retarder controller 32 calculates the four types of the lateral accelerations, and judges that the vehicle is in the rollover predictor status and outputs the notification signal when one of the lateral accelerations becomes a threshold or more. Accordingly, the retarder controller 32 can notify the operator of the rollover predictor status using the multimonitor 33. Thus, the rollover predictor can be appropriately determined in various travel conditions of the combination vehicle 1, so that the rollover predictor judgment of the rear vehicle body 3 can be appropriately performed.

The lateral acceleration ay detected by the lateral acceleration sensor 26 is not directly used as the first lateral acceleration ay1 but is corrected with reference to the roll angle φ. Accordingly, even when the rear vehicle body 3 is inclined in the right-left direction, the lateral acceleration applied to the rear vehicle body 3 can be accurately detected.

The first to fourth thresholds a1 to a4 can be corrected using a correction value corresponding to the vehicle status (e.g. whether the dump body 8 is loaded or not). Accordingly, the rollover predictor judgment can be appropriately made by comparing the corrected first to fourth thresholds a1 to a4 with the first to fourth lateral accelerations ay1 to ay4.

Second Exemplary Embodiment

Figure 9:
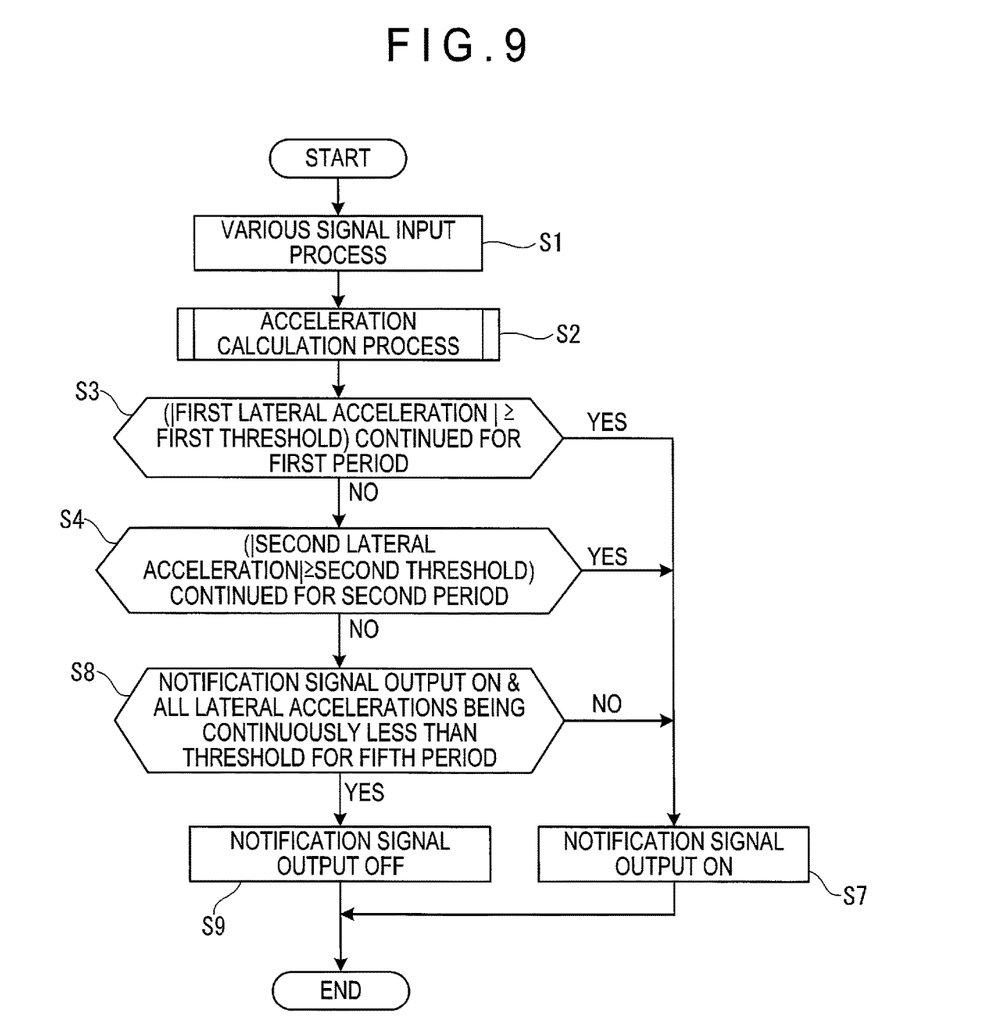
FIG. 9 is flowchart showing a rollover-predictor judgment process according to a second exemplary embodiment of the invention.

As shown in FIG. 9, the retarder controller 32 according to the second exemplary embodiment performs the rollover predictor judgment process, in which the judgment process (Step S3) for judging whether the absolute value of the first lateral acceleration ay1 is continuously the first threshold a1 or more for the first period t1 and the judgment process (Step S4) for judging whether or not the absolute value of the second lateral acceleration ay2 keeps the second threshold a2 or more for the second period t2, but the judgment processes of Steps S5 and S6 in the first exemplary embodiment are not performed.

Accordingly, in the various signal input process S1 of the second exemplary embodiment, it is only necessary for the retarder controller 32 to receive the signals necessary for calculating the first lateral acceleration ay1 and the second lateral acceleration ay2. Specifically, it is only necessary that the lateral acceleration ay, the roll angle φ, the yaw rate R and the articulate angle δ are inputted, and the wheel speed required for calculating the vehicle speed is not necessary to be inputted.

In the acceleration calculation process S2 of the second exemplary embodiment, the retarder controller 32 performs the first lateral acceleration calculation process (Step S22) and the second lateral acceleration calculation process (Step S23), but does not perform the vehicle speed calculation process (Step S21), the third lateral acceleration calculation process (Step S24) and the fourth lateral acceleration calculation process (Step S25) performed in the first exemplary embodiment.

The retarder controller 32 outputs the notification signal to the multimonitor 33 when the absolute value of the calculated first lateral acceleration ay1 is continuously the first threshold a1 or more for the first period t1 (i.e. when the judgment result in Step S3 is "YES"), or when the absolute value of the calculated second lateral acceleration ay2 is continuously the second threshold a2 or more for the second period t2 (i.e. when the judgment result in Step S4 is "YES") (Step S7).

When all of the judgment results of the retarder controller 32 in Steps S3 to S4 are "NO", the retarder controller 32 judges whether or not a period in which the notification signal output is set on and the first and second lateral accelerations ay1 and ay2 are continuously less than corresponding thresholds for the fifth period t5 (Step S8). When the judgment result in Step S8 is "YES", the retarder controller 32 set off the output of the notification signal (Step S9).

Since the rollover predictor is judged by comparing the two lateral accelerations with corresponding thresholds in the second exemplary embodiment, the rollover predictor can be appropriately judged for the combination vehicle 1 in various travelling states. Accordingly, the rollover predictor judgment of the rear vehicle body 3 can be appropriately performed.

Especially, as shown in Table 1, since the rollover predictor is judged based on the first lateral acceleration ay1 and the second lateral acceleration ay2, at least one of the lateral accelerations exhibits a high detection accuracy during the large-roll-angle case, tire-slip/tire-lock and understeering/oversteering, so that the rollover predictor can be appropriately judged.

Third Exemplary Embodiment

Figure 10:
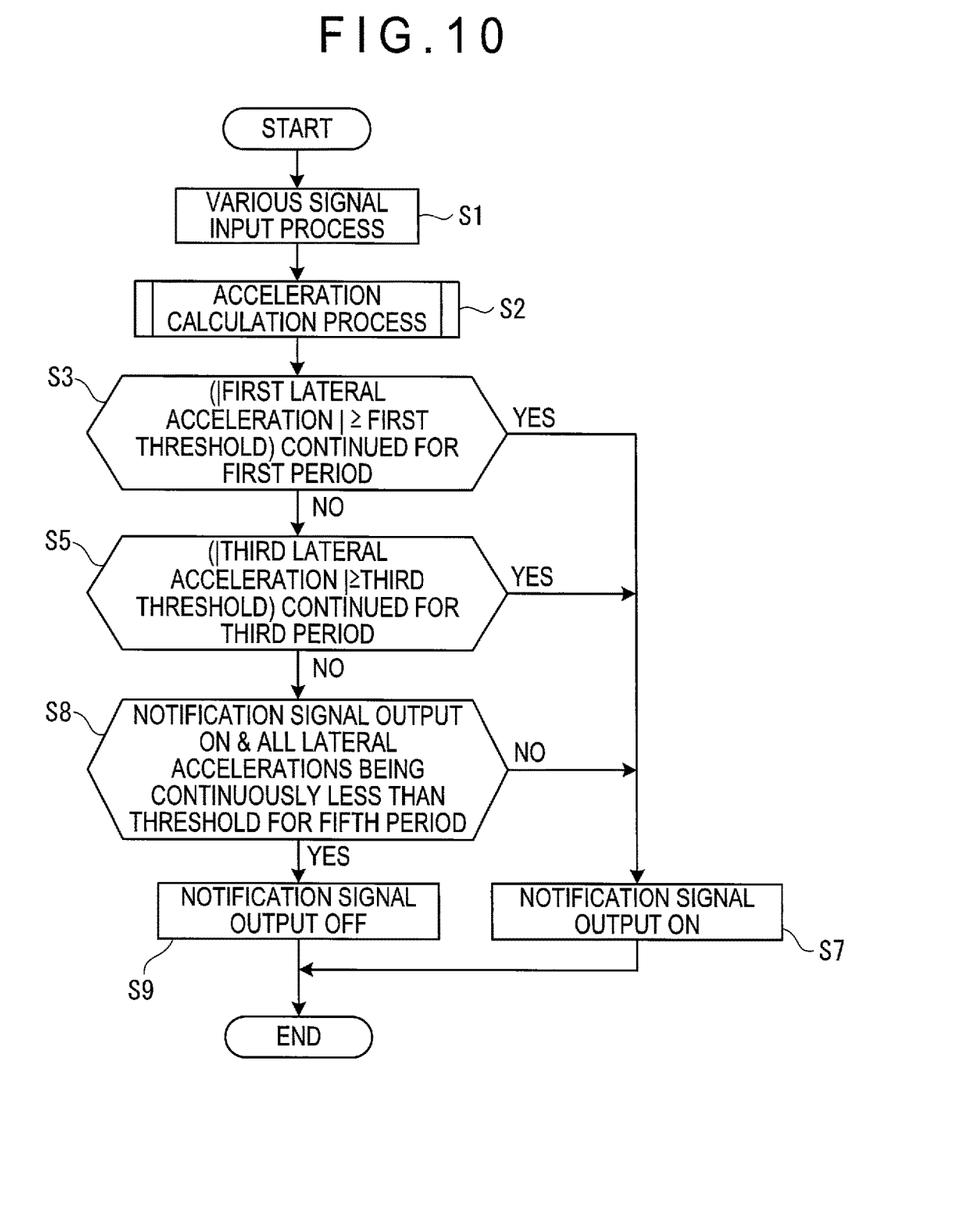
FIG. 10 is a flowchart showing a rollover-predictor judgment process according to a third exemplary embodiment of the invention.

As shown in FIG. 10, the rollover predictor judgment process performed by the retarder controller 32 according to the third exemplary embodiment includes the judgment process (Step S3) for judging whether the absolute value of the first lateral acceleration ay1 keeps the first threshold a1 or more for the first period t1 and the judgment process (Step S5) for judging whether or not the absolute value of the third lateral acceleration ay3 keeps the third threshold a3 or more for the third period t3, but does not include the judgment processes of Steps S4 and S6 in the first exemplary embodiment.

Accordingly, in the various signal input process S1 and the acceleration calculation process S2 of the second exemplary embodiment, it is only necessary for the retarder controller 32 to receive the signals necessary for calculating the first lateral acceleration ay1 and the third lateral acceleration ay3. Specifically, it is only necessary that the lateral acceleration ay, the roll angle ϕ, the wheel speed and the articulate angle δ are inputted, and the yaw rate R is not necessary to be inputted.

In the acceleration calculation process S2 of the second exemplary embodiment, the retarder controller 32 performs the first vehicle speed calculation process (Step S21), the first lateral acceleration calculation process (Step S22) and the third lateral acceleration calculation process (Step S24), but does not perform the second lateral acceleration calculation process (Step S23) and the fourth lateral acceleration calculation process (Step S25) performed in the first exemplary embodiment.

The retarder controller 32 performs the judgment process (Step S3) based on the first lateral acceleration ay1 and the judgment process (Step S5) based on the third lateral acceleration ay3. When the results of one of the judgment processes are "YES", the retarder controller 32 issues the notification signal to the multimonitor 33 (Step S7).

When all of the judgment results of the retarder controller 32 in Steps S3 and S5 are "NO", the retarder controller 32 judges whether or not the notification signal output is set on and a period in which the first and third lateral accelerations ay1 and ay3 are continuously less than corresponding thresholds for the fifth period t5 (Step S8). When the judgment result in Step S8 is "YES", the retarder controller 32 sets off the output of the notification signal (Step S9).

Since the rollover predictor is judged by comparing the two lateral accelerations with corresponding thresholds in the third exemplary embodiment, the rollover predictor can be appropriately judged for the combination vehicle 1 in various travelling states. Accordingly, the rollover predictor status of the rear vehicle body 3 can be appropriately judged.

Especially, as shown in Table 1, since the rollover predictor is judged based on the first lateral acceleration ay1 and the third lateral acceleration ay3, at least one of the lateral accelerations exhibits a high detection accuracy and excellent responsiveness during the large-roll-angle case, tire-slip/tire-lock and understeering/oversteering, so that the rollover predictor can be appropriately judged.

Modification(s)

Incidentally, it should be understood that the scope of the present invention is not limited to the above-described exemplary embodiments but includes modifications and improvements as long as the modifications and improvements are compatible with the invention.

For instance, the retarder controller 32 may perform the judgment process of the rollover predictor status based on three lateral accelerations of the first lateral acceleration ay1, the second lateral acceleration ay2 and the third lateral acceleration ay3. In this case, as shown in Table 1, since at least one of the lateral accelerations exhibits a high detection accuracy and excellent responsiveness during the large-roll-angle case, tire-slip/tire-lock and understeering/oversteering, the rollover predictor can be appropriately judged.

Alternatively, the retarder controller 32 may perform the judgment process of the rollover predictor status based on three lateral accelerations of the first lateral acceleration ay1, the third lateral acceleration ay3 and the fourth lateral acceleration ay4. In this case, as shown in Table 1, since at least one of the lateral accelerations exhibits a high detection accuracy and excellent responsiveness during the large-roll-angle case, tire-slip/tire-lock and understeering/oversteering, the rollover predictor can be appropriately judged.

Further alternatively, the retarder controller 32 may perform the judgment process of the rollover predictor status based on three lateral accelerations of the first lateral acceleration ay1, the second lateral acceleration ay2 and the fourth lateral acceleration ay4. In this case, as shown in Table 1, since at least one of the lateral accelerations exhibits a high detection accuracy during the large-roll-angle case, tire-slip/tire-lock and understeering/oversteering, the rollover predictor can be appropriately judged.

In the above exemplary embodiments, the first lateral acceleration ay1 is defined by a corrected lateral acceleration (i.e. a value correcting the lateral acceleration ay measured by the lateral acceleration sensor 26 of the IMU 25 using the roll angle ϕ). However, the lateral acceleration ay measured by the lateral acceleration sensor 26 may be directly used. In this case, an error occurs between the actual lateral acceleration and the lateral acceleration ay when the roll angle $\phi$ increases. However, since the second to fourth lateral accelerations ay2 to ay4 can be highly accurately measured even when the roll angle $\phi$ increases and the judgment is based also on the second to fourth lateral accelerations ay2 to ay4, the influence of the above error on the rollover predictor judgment can be restrained.

Alternatively, the first lateral acceleration may be defined by both of the first lateral acceleration ay1 corrected using the roll angle $\phi$ and the lateral acceleration ay measured by the IMU 25, and the judgment result "YES" may be made in Step S3 when the first lateral acceleration ay1 is a predetermined threshold or more or when the lateral acceleration ay is a predetermined threshold or more.

The combination vehicle 1 of the invention is not limited to the articulated dump truck but may be a combination vehicle including a tractor and a trailer.

The invention claimed is:

1. A rollover predictor judgment device for a combination vehicle comprising a front vehicle body and a rear vehicle body swingably connected to the front vehicle body, the rollover predictor judgment device comprising:
   a lateral acceleration sensor that is configured to detect an acceleration of the rear vehicle body in a right-left direction;
   a yaw rate sensor that is configured to detect a yaw rate of the rear vehicle body;
   an articulate angle sensor that is configured to detect an articulate angle of the front vehicle body with respect to the rear vehicle body; and
   a judgment device that is configured to judge whether or not the combination vehicle is in a rollover predictor status based on a detection data detected by the lateral acceleration sensor, the yaw rate sensor and the articulate angle sensor; and
   a notifying device that is configured to notify that the combination vehicle is in a rollover predictor status when the rollover predictor judgment device judges that the combination vehicle is in the rollover predictor status, wherein
   the judgment device is configured to judge that the combination vehicle is in the rollover predictor status when a first lateral acceleration calculated based on a detection value of the lateral acceleration sensor is a first threshold or more, or when a second lateral acceleration calculated based on a detection value of the yaw rate sensor and a detection value of the articulate angle sensor is a second threshold or more, and
   the judgment device is configured to output a notification signal to the notifying device to notify that the combination vehicle is in the rollover predictor status and, subsequently, configured to stop outputting the notification signal when a status judged not to be in the rollover predictor status continued for a predetermined period.

2. The rollover predictor judgment device for the combination vehicle according to claim 1, further comprising:
   a vehicle speed sensor that is configured to detect a speed of the combination vehicle, wherein
   the judgment device is configured to judge that the combination vehicle is in the rollover predictor status when a fourth lateral acceleration calculated based on a detection value of the yaw rate sensor and the detection value of the vehicle speed sensor is a fourth threshold or more.

3. The rollover predictor judgment device for the combination vehicle according to claim 1, further comprising:
   a roll angle sensor that is configured to detect a roll angle of the rear vehicle body, wherein
   the judgment device is configured to correct the detection value of the lateral acceleration sensor based on a detection value of the roll angle sensor to calculate the first lateral acceleration.

4. The rollover predictor judgment device for the combination vehicle according to claim 1, wherein
   the judgment device is configured to multiply a square of the detection value of the yaw rate sensor by a revolution radius calculated based on the detection value of the articulate angle sensor to calculate the second lateral acceleration.

5. A rollover predictor judgment device for a combination vehicle comprising a front vehicle body and a rear vehicle body swingably connected to the front vehicle body, the rollover predictor judgment device comprising:
   a lateral acceleration sensor that is configured to detect an acceleration of the rear vehicle body in a right-left direction;
   a vehicle speed sensor that is configured to detect a speed of the combination vehicle;
   an articulate angle sensor that is configured to detect an articulate angle of the front vehicle body with respect to the rear vehicle body; and
   a judgment device that is configured to judge whether or not the combination vehicle is in a rollover predictor status based on a detection data detected by the lateral acceleration sensor, the vehicle speed sensor and the articulate angle sensor; and
   a notifying device that is configured to notify that the combination vehicle is in a rollover predictor status when the rollover predictor judgment device judges that the combination vehicle is in the rollover predictor status, wherein
   the judgment device is configured to judge that the vehicle is in the rollover predictor status when a first lateral acceleration calculated based on a detection value of the lateral acceleration sensor is a first threshold or more or when a third lateral acceleration calculated based on a detection value of the vehicle speed sensor and a detection value of the articulate angle sensor is a third threshold or more, and
   the judgment device is configured to output a notification signal to the notifying device to notify that the combination vehicle is in the rollover predictor status and, subsequently, configured to stop outputting the notification signal when a status judged not to be in the rollover predictor status continued for a predetermined period.

6. The rollover predictor judgment device for the combination vehicle according to claim 5, further comprising:
   a yaw rate sensor that is configured to detect a yaw rate of the rear vehicle body, wherein
   the judgment device is configured to judge that the combination vehicle is in the rollover predictor status when a second lateral acceleration calculated based on a detection value of the yaw rate sensor and the detection value of the articulate angle sensor is a second threshold or more.

7. The rollover predictor judgment device for the combination vehicle according to claim 6, wherein
   the judgment device is configured to multiply a square of the detection value of the yaw rate sensor by a revolution radius calculated based on the detection value of the articulate angle sensor to calculate the second lateral acceleration.

8. The rollover predictor judgment device for the combination vehicle according to claim 5, wherein
the judgment device is configured to divide a square of the vehicle speed calculated based on the detection value of vehicle speed sensor by a revolution radius calculated based on the detection value of the articulate angle sensor to calculate the third lateral acceleration.

9. The rollover predictor judgment device for the combination vehicle according to claim 5, further comprising:
a yaw rate sensor that is configured to detect a yaw rate of the rear vehicle body,
wherein
the judgment device is configured to judge that the combination vehicle is in the rollover predictor status when a fourth lateral acceleration calculated based on the detection value of the yaw rate sensor and the detection value of the vehicle speed sensor is a fourth threshold or more.

10. The rollover predictor judgment device for the combination vehicle according to claim 5, further comprising:
a roll angle sensor that is configured to detect a roll angle of the rear vehicle body, wherein
the judgment device is configured to correct the detection value of the lateral acceleration sensor based on a detection value of the roll angle sensor to calculate the first lateral acceleration.

* * * * *